(12) United States Patent
Takami et al.

(10) Patent No.: US 7,538,455 B2
(45) Date of Patent: May 26, 2009

(54) ELECTRONIC DEVICE, POWER SOURCE CONTROL METHOD, ROF SYSTEM AND ITS POWER SUPPLYING METHOD AND REMOTE UNIT

(75) Inventors: Masayuki Takami, Hino (JP); Yoshiki Namba, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 396 days.

(21) Appl. No.: 11/446,959

(22) Filed: Jun. 6, 2006

(65) Prior Publication Data

US 2006/0281434 A1    Dec. 14, 2006

(30) Foreign Application Priority Data

Jun. 7, 2005    (JP)    ............................ 2005-167279

(51) Int. Cl.
*H01H 43/04* (2006.01)
*H02J 3/14* (2006.01)
(52) U.S. Cl. ........................ 307/141; 307/140; 323/351; 323/908
(58) Field of Classification Search ............... 307/11, 307/12, 31, 35, 41, 135, 141, 141.4, 40, 140; 323/267, 225, 349, 350, 351, 908; 398/115, 398/116, 117
See application file for complete search history.

(56) References Cited

U.S. PATENT DOCUMENTS

| 6,000,338 | A | 12/1999 | Shann |
| 6,785,558 | B1 * | 8/2004 | Stratford et al. ............. 455/561 |
| 7,127,176 | B2 * | 10/2006 | Sasaki ........................ 398/115 |

FOREIGN PATENT DOCUMENTS

| JP | 2-295389 | 12/1990 |
| WO | WO 96/16462 A1 | 5/1996 |

OTHER PUBLICATIONS

Combined Search and Examination Report from the British Patent Office, dated Oct. 3, 2006, in British Application No. GB0611122.3.
Communication dated Sep. 17, 2007 from the Canadian Intellectual Property Office for Canadian Application No. 2,549,502.

* cited by examiner

*Primary Examiner*—Gary L Laxton
(74) *Attorney, Agent, or Firm*—Finnegan, Henderson, Farabow, Garrett & Dunner, L.L.P.

(57) ABSTRACT

Electronic devices to which power is supplied from a power supplying unit commonly connected with other electronic devices, each of the electronic devices comprising a switch unit having an input terminal, an output terminal and a control terminal to which a control signal to close between the input terminal and the output terminal, a number input unit to which unique identification information is input, and a timing unit connected to the power supplying device together with the input terminal and inputting the control signal to the control terminal after a lapse of a delay time set in response to the identification information from a start timing of power supplying by the power supplying device.

15 Claims, 6 Drawing Sheets

FIG. 1

| Remote unit | Identification number | Resistor | Resistance value KΩ | Capacitance value μF | Delay time msec (reaching time to 70% of peak value) |
|---|---|---|---|---|---|
| 2a | 1 | R10 | 10 | 10 | 120 |
| 2b | 2 | R11 | 20 | | 241 |
| 2c | 3 | R12 | 30 | | 361 |
| 2d | 4 | R13 | 40 | | 481 |
| 2e | 5 | R14 | 50 | | 602 |
| 2f | 6 | R15 | 60 | | 722 |
| 2g | 7 | R16 | 70 | | 843 |
| 2h | 8 | R17 | 80 | | 963 |
| 2j | 9 | R18 | 90 | | 1084 |
| 2k | 10 | R19 | 100 | | 1204 |

ELECTRONIC DEVICE, POWER SOURCE CONTROL METHOD, ROF SYSTEM AND ITS POWER SUPPLYING METHOD AND REMOTE UNIT

CROSS-REFERENCE TO RELATED APPLICATIONS

This application is based upon and claims the benefit of priority from prior Japanese Patent Application No. 2005-167279, filed Jun. 7, 2005, the entire contents of which are incorporated herein by reference.

BACKGROUND OF THE INVENTION

1. Field of the Invention

The present invention relates to an electronic device of a system for simultaneously operating a plurality of electronic devices, a power source control method, a radio over fiber (ROF) system and its power supplying method and a remote unit.

2. Description of the Related Art

For instance, when starting up electronic devices and information processing terminals such as a plurality of automatic teller machines connected to a host device in an automatic teller system of a bank, inrush currents are greatly generated when power is turned on. And also when television receivers of a video distribution system, etc., are turned on simultaneously, rush currents are greatly generated. Therefore, it is needed for the power source capacity of the system to be made larger than that of in the normal operation. And an occurrence of variations in power also at a primary power source side results in prevention of a stable operation.

As a measure to deal with foregoing problems, a conventional system starts up each electronic device in turn by shifting power supply timings (start up timings) little by little to each electronic device on the power supply side of the system then the system suppresses addition and superposition of the rush currents. For the method of the measure, the video distribution system employs a method for inserting a delay line in the middle of a bus line of a power source supplying power to the television receiver [for instance, Jpn. Pat. Appln. KOKAI publication No. 2-295389 (on page 4, FIG. 1)].

In an ROF system, a remote unit power supply device disposed on a base station side of a cellular phone supplies power to each remote unit. Each remote unit having been installed in a distant construction such as a building or a tower, feeder cables are not connected through bus lines but laid to each remote unit from the remote unit power supply device in a radial pattern. Accordingly, it is impossible to easily set a delay time only by inserting delay lines each having the same delay time into the bus line of a remote unit to be connected next in cascade between adjacent stations. Therefore, it is needed to manage complicatedly in such a manner that delay lines deferring in value for each remote unit have to be inserted to feeder lines for each remote unit.

In a conventional method, the ROF system has to manage the remote unit power supply device so as to supply power with delay times deferring for each electronic device and television receiver from the power supplying device side after power is turned on. Therefore, the ROF system has a problem that a complicated management is required and a device scale is increased.

BRIEF SUMMARY OF THE INVENTION

An object of the present invention is to provide an electronic device which is easy to manage a power source to supply power to a plurality of electronic devices and has small rush currents, a power source control method, an ROF system and its power supplying method and remote unit.

According to an aspect of the present invention, there is provided an electronic devices to which power is supplied from a power supplying unit commonly connected with other electronic devices, each of the electronic devices comprising: a switch unit having an input terminal, an output terminal and a control terminal to which a control signal to close between the input terminal and the output terminal; a number input unit to which unique identification information is input; and a timing unit connected to the power supplying device together with the input terminal and inputting the control signal to the control terminal after a lapse of a delay time set in response to the identification information from a start timing of power supplying by the power supplying device.

According to the present invention, an electronic device which is easy to manage a power turning on timing and also has small rush currents, a power source control method, an ROF system and its power supplying method and remote unit can be provided.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

FIRST EMBODIMENT

Figure 1:
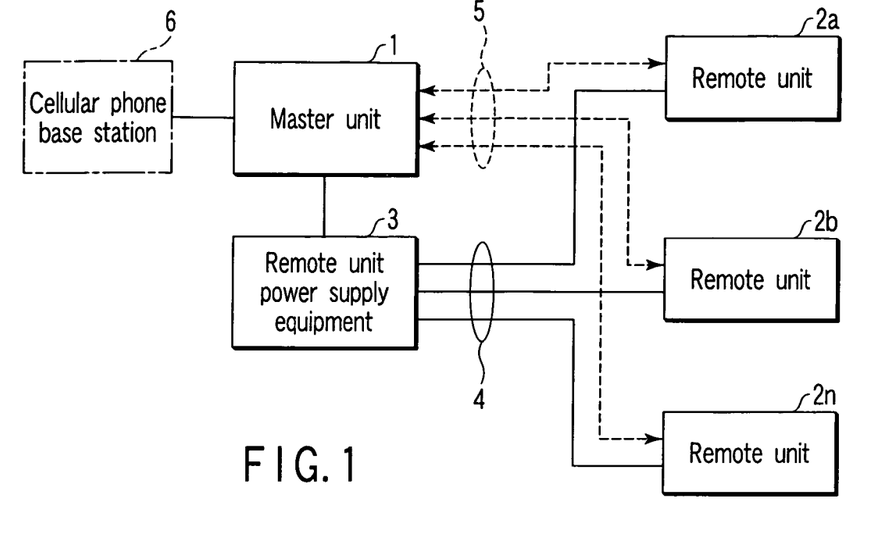
FIG. 1 is an exemplary block diagram showing a functional configuration of an ROF system of a cellular phone base station with a power source control method regarding an embodiment of the invention applied thereto.

FIG. 1 the exemplary block diagram showing the functional configuration of the radio over fiber (ROF) system of the cellular phone base station with the power source control method regarding the embodiment of the present invention applied thereto. The ROF system in FIG. 1 includes a master unit 1, remote units 2a-2n that are electronic devices to be operated by a power control method of the invention, a remote unit power supply equipment 3, feeder lines 4 to each remote unit 2a-2n and optical fiber cables 5.

The ROF system is one in which each small-sized base station having a small output and a cover area, namely each of the remote unit 2a-2n (hereinafter, the each remote unit 2a-2n will be explained by a remote unit 2 as a representative thereof unless there is any need to distinguish each remote unit 2a-2n) operates as a cellular phone base station. Each remote unit 2a-2n is connected with a master unit 1 by means of the optical fiber cable 5 and each remote unit 2 converts an electric wave to be transmitted and received into an optical signal to transmit it.

In the ROF system, the remote unit power supply equipment 3 is connected to each remote unit 2a-2n through the feeder lines 4 in a radial pattern. Thereby, it is impossible for the ROF system to adjust occurrence timings of rush currents at each remote unit by inserting delay lines in cascade to each feeder line (power supplying cable) connected to the next remote unit like the case in which power is supplied divergingly thorough a bus line.

That is, the master unit 1 is installed in an equipment room in a usual building, and each remote unit 2 is distributed and deposed into its building and a construction such as adjacent building and a tower. The remote unit power supply equipment 3 belonging to the master unit 1 supplies power to each remote unit 2 through the feeder lines 4 laid in a radiation manner (star-shape). The feeder line has an approximately several hundred meter at a maximum, so that a delay time difference caused by a difference of cable lengths is small. Thereby, when the remote unit power supply device 2 is turned on, with no difference in power reception timing (start up timing) of each remote unit 2 that is the power supplying destination, so that rush currents generated at each remote unit are superimposed. Accordingly, the ROF system needs to perform timing control so as not to superimpose the rush currents by shifting the timing of the power supplying to each remote unit 2.

Figure 2:
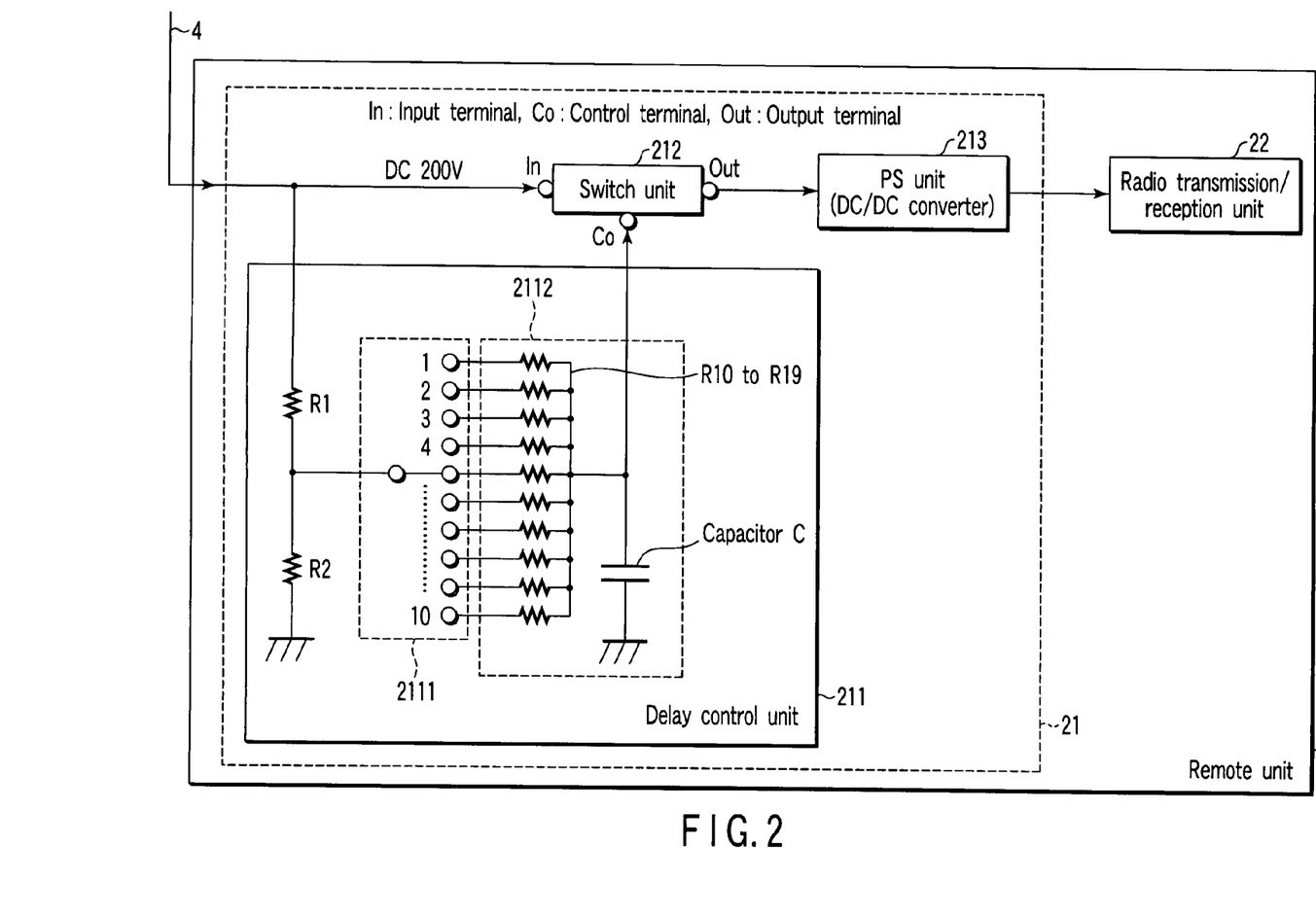
FIG. 2 is an exemplary block diagram showing an example of a first functional configuration of a remote unit.

FIG. 2 is the block diagram showing the example of the first functional configuration of the remote unit 2.

In FIG. 2, the remote unit 2 includes a delay control unit 211, a switch unit 212, a power source unit 21 and a radio transmission/reception unit 22. A power supply (PS) unit 213 is, for instance, a DC/DC converter. The PS unit 213 may be preferable to be included in the transmission/reception unit 22; however, hereinafter, it will be described as if it is included in the power source unit 21 for the sake of convenience.

When the remote unit power supply equipment 3 is turned on, the power source unit 21 controls the timing to switch on the switch unit 212 from the time point when the delay control unit 211 started power supplying (received power) to output a voltage to the PS unit 213. The PS unit 213 then outputs prescribed power to the transmission/reception unit 22. The delay control unit 211 has a number input unit 2111 composed of a dial, etc., to input identification information (number, etc.) of each remote unit 2 and a timing unit 2112 to control a timing to turn on the switch unit 212 in response to the input identification number.

The power which is supplied by the remote unit power supply equipment 3 to each remote unit 2 is mainly a DC power source of 100-200V and the following explanation will be described as an example of a DC 200V power source for the sake of convenience. Even if other low-voltage DC power source or power source of 100V AC, the timing control to turn on the power source (power source start) goes same.

Referring to FIG. 2, operations of the remote unit 2 will be set forth. In FIG. 2, each remote unit 2 is supplied power of 200V DC from a feeder line 4. The power source of 200V DC is input to the input terminal of the switch unit 212 and the delay control unit 211.

The delay control unit 211, as a first example, has a resister R1 and a resister R2 for voltage dividing, a dial switch S that is a number input unit 2111, and a timing unit 2112 having resisters R10-R19 connected to switching terminals ('1'-'10') of the dial switch S and a capacitor C connected to a common connection side of the resisters R10-R19. These resisters R10-R19 and the capacitor C consists of an integration circuit and the output from the integration circuit is output to a control terminal Co of the switch unit 212, as a control signal.

At the switch unit 212, the voltage of the input control signal increases with the time constant of the integration circuit. And at the timing when the voltage becomes a prescribed voltage, the switch unit 212 turns on. The output terminal Out of the switch unit 212 supplies a voltage of 200V DC to the PS unit (DC/DC converter) 213 to start up the remote unit 2.

The voltage divided by the resister R1 and the resister R2 may be set, for example, to 5V when using an FET switch which is turned on at 3-5V of a gate voltage for the switch unit 212. To obtain a desired divided voltage, here, a voltage of 5V, a low-voltage diode may be used in stead of resisters.

Unique identification information (a sequence of numbers, for instance, '1' for a remote unit 2a, '2' for a remote unit 2b) is added though the ROF system in advance, and the sequence of numbers and each switching terminal ('1', '2', etc.) are matched with one another. The dial switch S may be one, for example, to match with the identification numbers displayed on a panel by a rotary switch, or may be one to specify numbers displayed on a display window like a thumb wheel switch.

Figure 3:
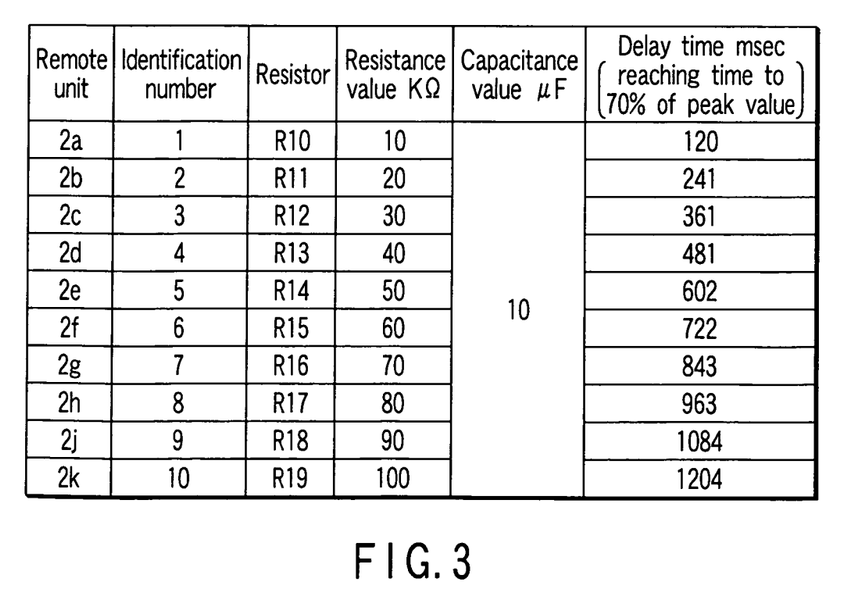
FIG. 3 is an exemplary view of a table explaining a relationship between an identification number and a delay time of a remote unit.

FIG. 3 is a table explaining a relationship between an identification number and a delay time of a remote unit. In FIG. 3, '1' is added to the remote unit 2a as an identification number to be input-set by the number input unit 2111 (dial switch S). The resistor R10 (a resistor of resistance value of 10 KΩ) is connected to a switching terminal corresponding to '1' of the dial switch S. Similarly, identification numbers of numbers '2'-'10' are added in sequential numbers to the remote unit 2a-2k, respectively, and resistors R11-R19 having resistance values which are each 10 KΩ larger at every switching terminal are connected to each switching terminal of each number, respectively. The other ends of each resistor R10-R19 are connected to the capacitor C of 10 µF commonly.

At the remote unit 2a of which the identification number is '1', the resistor R10 selected by the dial switch C consists of an integration circuit together with the capacitor C and a raising time (time constant) of 70% of a final reaching voltage becomes 120 millisecond (millisecond). Similarly, at the remote unit 2k of which the identification number is '10', the resistor R19 having been selected, the raising time becomes 1204 millisecond.

The timing unit 2112 setting raising times (delay times) of each remote unit 2 adjusts, as shown in FIG. 2, the time constant of the integration circuit by switching the resistors R10-R19. In stead of this, the timing unit 2112, of course, may adjust the delay times of the integration circuit by changing the capacitor C while maintaining the value of resistors R10-R19 constant.

For instance, at the delay control unit 211 of the remote unit 2a, the elapse of 120 millisecond after the start of power supplying from the remote unit power supply equipment 3, a voltage of 5×0.7=3.5V needed for the switch unit 212 to turn on is obtained. Here, the voltage of 200V DC is applied to the PS unit 213 to start up the remote unit 2a and a transient phenomenon accompanying power supplying occurs to pass rush currents.

Figure 4A:
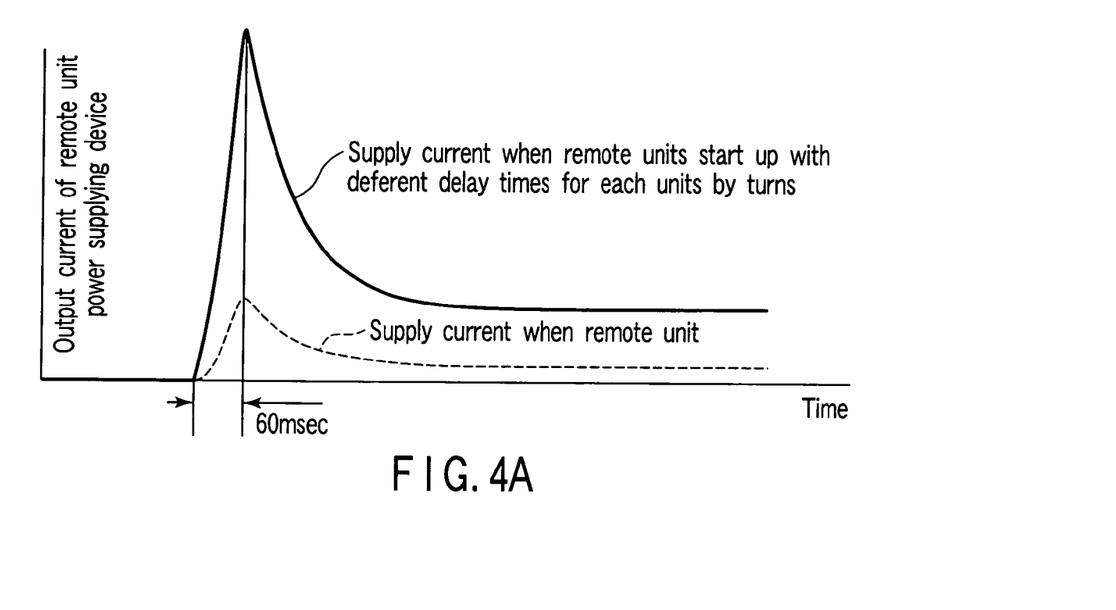
FIGS. 4A and 4B are schematic views showing supply currents of power supplying devices at start up times of each remote unit.
Figure 4B:
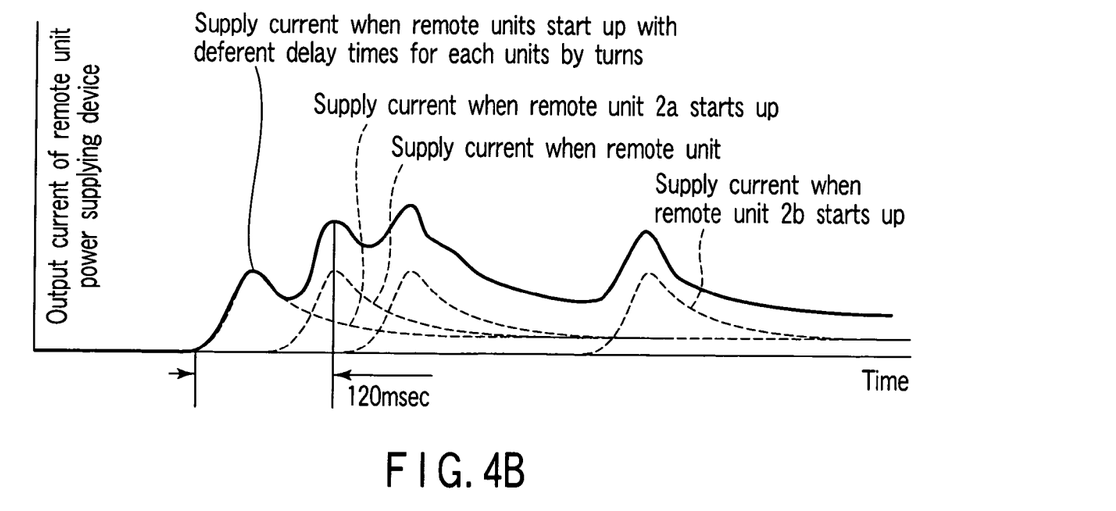

FIG. 4A and FIG. 4B are schematic views showing supply currents from the remote unit power supply equipments 3 at the start up times of each remote unit 2. FIG. 4A shows the case in which delay times are not set to each remote unit 2 but each remote unit 2 starts up immediately after power supplying from the remote unit power supply equipment 3. In this case, when n sets of remote units 2a-2n are turned on simultaneously, the rush current becomes n times at the time when the supply current reaches a peak (for example, 60 millisecond after turning on).

In contrast, in the first embodiment, delays in start up timing of each remote unit 2 are provided, respectively, as shown in FIG. 4B. For example, a delay time after power supplying is not set on the remote unit 2a and a delay time of 60 millisecond is set on the timing at which the switch unit 212 of the remote unit 2b is tuned on.

In this case, the timing at which the rush current of the remote unit 2b reaches a peak becomes a time point with further 60 millisecond passed thereto after the rush current of the remote unit 2a reached the peak (120 millisecond after turning on the remote unit power supply equipment 3). At this time point, the rush current of the remote unit 2a has passed the peak to decrease toward a steady-state value. Therefore, at this time point, the current supplied from the remote unit power supply equipment 3 becomes a value lower than the value that is made twice as large as the rush currents at every one set of the remote units 2.

More specifically, the delay time at which each remote unit 2 is turned on, namely, switch unit 212 turns on is made longer than the time at which the rush current of each remote unit 2 reaches the peak (wherein 60 millisecond). Furthermore, the remote unit 2 sets the time constant of the timing unit 2112, namely the integration circuit so that the delay times set to each remote unit 2 become longer that the peak reaching time. Thereby, the remote unit 2 can prevent the current supplied from the remote unit power supply equipment 3 becoming n times of the rush current of one set of the remote unit 2.

Especially, as shown in FIG. 4B, if the start up timing is set so that the remote unit 2d is turned on after termination of a rush current, influence of the rush current is further reduced. Thereby, the remote unit 2 can reduce the supply current capacity of the remote unit power supply equipment 3 and suppress load variations on the primary power source.

As mentioned above, like this embodiment, the ROF system can avoid superimposing the rush currents without having to make the remote unit power supply equipment 3 control the power source start up timings for each remote unit 2.

SECOND EMBODIMENT

Figure 5:
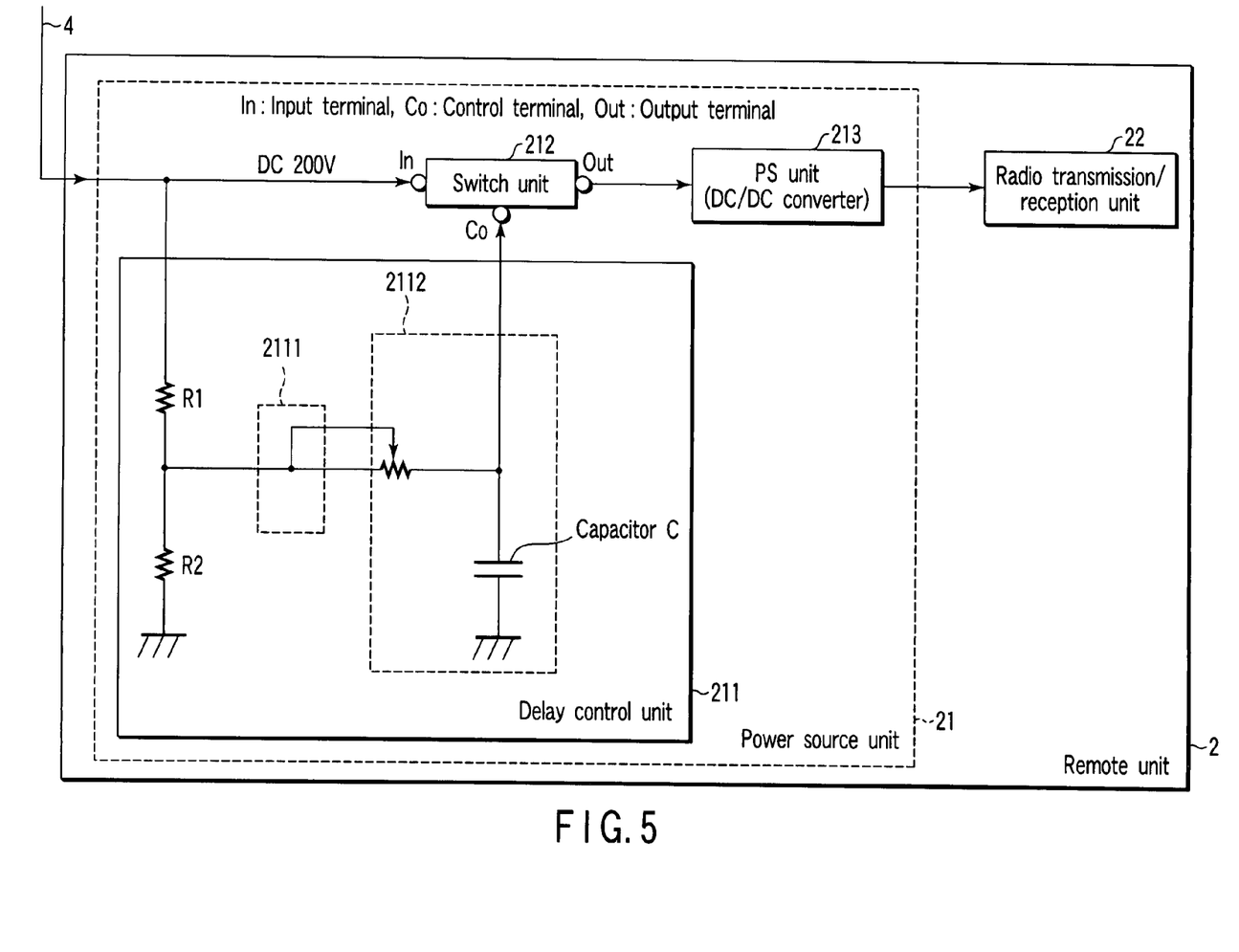
FIG. 5 is an exemplary bock diagram showing an example of a second functional configuration of the delay control unit.

FIG. 5 is an example of a second configuration of the remote unit 2. In FIG. 5, a vernier dial D is used for the number input unit 2111 of the delay control unit 211. The timing unit 2112 has a potentiometer Rp and a capacitor C which are combined with the vernier dial D. The vernier dial D can display a resistance division ratio of the potentiometer Rp in response to a rotary ratio of the vernier dial D. For instance, if remote unit numbers are assigned by a dial memory at every time to divide equally into ten, the time constant can be adjusted in a similar way in a dial switch S like the thumb wheel switch.

That is to say, it is presumed that the number of the sets of the remote units is 10 and the potentiometer Rp of 100 KΩ is in use. The ROF system then adds the number 10 to the remote unit 2a and matches the scale of the vernier dial D with 10. The ROF system further adds the number 20 to the remote unit 2b and matches the scale of the vernier dial D with 20. Thereby, at every increase by 10 in the number (every memory position to be divided equally into 10), the resistance value of the potentiometer Rp increases by 10 KΩ. Therefore, like the case of use of the dial switch S, the ROF system can set the timing at every around 120 millisecond.

The setting of equal divisions into 100 by the scale of the vernier dial D enables fitting also to set two-digit identification information (number). For instance, for using a potentiometer of 1 MΩ, resistance values of 10 KΩ steps which are divided equally into 100 are combined with a capacitor C of 10 μF then delay times in units of around 120 millisecond can be set.

THIRD EMBODIMENT

Figure 6:
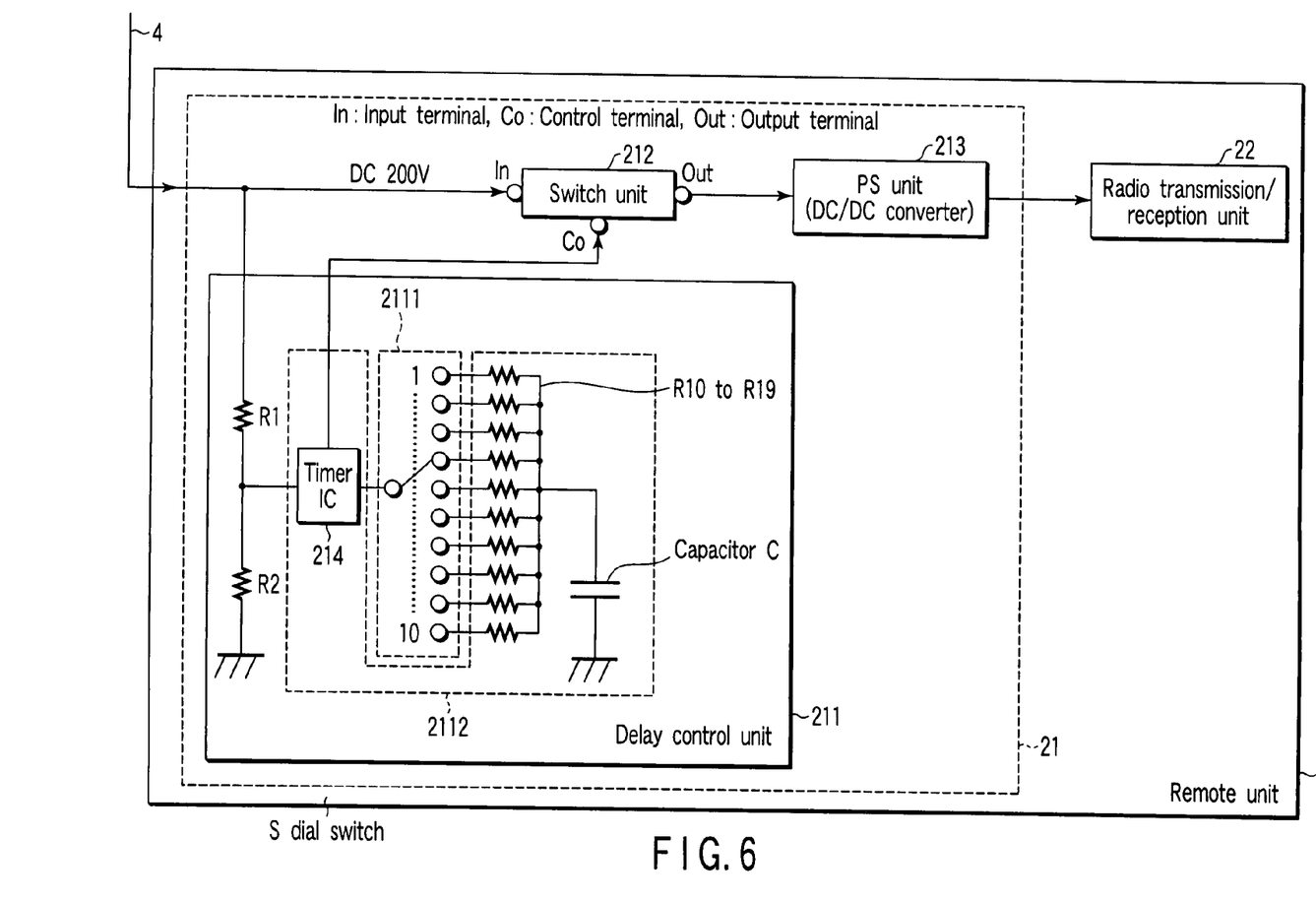
FIG. 6 is an exemplary block diagram showing an example of a third functional configuration of the delay control unit.

FIG. 6 is an example of a third configuration of the delay control unit 211. In this example, the delay control unit 211 has the dial switch S at the number input unit 2111. The timing unit 2112 has a timer IC 214 and the resistors R10-R19. The timer IC 214 outputs a voltage of, for example, 5V required by the switch unit 212. Adding this voltage brings the switch unit 212 into an on state. A DC power source voltage-divided by the resistors R1 and R2 is connected to the timer IC 214.

In this third embodiment, the delay control unit 211 controls the start up timing of the remote unit 2 by connecting the time constant circuit composed of the resistors R10-R19 and the capacitor C to timing setting terminals of the timer IC 214. The delay control unit 211 outputs a switch control signal of 5V to the switch unit 212 from the timer IC 214 at the same timings as those of the first and second embodiments.

With respect to setting methods of delay times, methods other than above-mentioned methods may be used appropriately. The essential point of the present invention is to each provide an input means of the identification information (number, etc.) and a delay control means for setting the delay times (time constants) corresponding to the identification information for each remote unit 2 (namely, electronic device or its power source device).

If the rush current at turning on the power source of the remote unit 2 does not become larger than a consumption current in a steady-state operation, the delay control unit 211 may be configured to make a plurality of remote units 2 turn on at the same timing.

Figure 7:
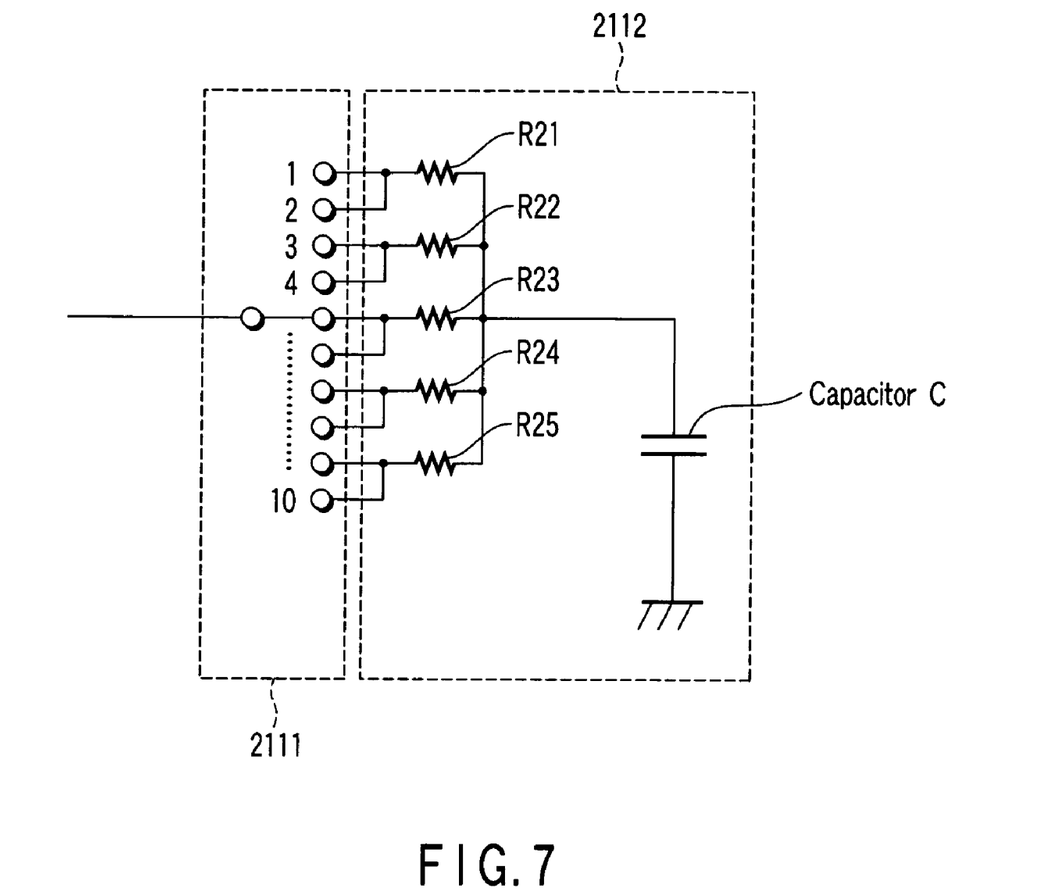
FIG. 7 is an exemplary connection view of a number input unit and a timing unit when two remote units turn on at the same timing.

FIG. 7 is the exemplary connection view of the number input unit and the timing unit when two sets of the remote units 2 turn on at the same timing. In the remote unit 2 in FIG. 7, a switch terminal of the dial switch S, for example, '1' is connected to the common resistor R21 so that two sets of the remote units 2 turn on simultaneously. Also with respect to other remote units 2, the resistors R22-R25 are connected to the dial switch S so that each pair of two sets thereof turns on at the same timing.

As described above, on the side of the remote unit power supply equipment 3, there is no need for each remote unit 2 to manage the timing to turn on. And also the method is simple, in which the remote unit 2 self-monitors the power supply voltage to control a timing of switch closing. Therefore, a power source control method and an electronic device for suppressing the rush currents in the ROF system can be achieved at ease and low costs.

The power source control method of the present invention is not limited to the ROF system, the method is applicable to the systems to be used by being combined with a plurality of electronic devices as described above and it goes without saying that the method is also applicable to the electronic devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device to which power can be supplied from a power supply connected with other electronic devices, the electronic device comprising:
   a switch unit having an input terminal, an output terminal and a control terminal which is adapted to receive a control signal to connect a circuit between the input terminal and the output terminal;
   a number input unit to which unique identification information can be input to set a corresponding delay time; and
   a timing unit connected to the power supply and arranged to apply the control signal to the control terminal after the set delay time has lapsed after the power supply has been switched on.

2. The electronic device according to claim 1, wherein the set delay time is set a time longer than a peaking time of a rush current which results from turning on the switch unit.

3. The electronic device according to claim 1, wherein:
   the number input unit comprises a changeover switch arranged to receive the unique identification information input by means of a dial; and
   the timing unit includes an integration circuit comprising a capacitor and plural resistors of unique resistance values corresponding to the unique identification information and being connected to switching terminals of the changeover switch; and
   the delay time corresponding to the unique identification information is set according to a particular capacitor-resistor combination.

4. The electronic device according to claim 3, wherein:
   an input of the integration circuit is connected to the input terminal of the switch unit; and
   an output of the integration circuit is connected to the control terminal of the switch unit, and the switch unit is arranged to turn on when the output voltage of the control terminal exceeds a prescribed voltage.

5. A method of controlling an electronic device according to claim 1, the method comprising inputting the unique identification information into the number input unit and switching the power supply on.

6. The method according to claim 5, comprising
   setting the delay time to be longer than a peaking time of a rush current which results from turning on the switch unit.

7. The method according to claim 5, comprising
   inputting the unique identification information by means of a dial and thereby setting the delay time corresponding to the unique identification information as a result of forming an integration circuit comprising a particular capacitor-resistor combination.

8. The method according to claim 7, wherein an input of the integration circuit is connected to the input terminal of the switch unit, an output of the integration circuit is connected to the control terminal of the switch unit, and the switch unit turns on when the output voltage of the control terminal exceeds a prescribed voltage.

9. A method of controlling a system comprising a power supply connected to a plurality of electronic devices according to claim 1, the method comprising
   inputting respective unique identification information into respective number input units of each of the electronic devices, and switching the power supply on.

10. The method according to claim 9, comprising:
    setting the delay time in each of the electronic devices to be longer than a peaking time of a rush current which results from turning on a respective switch unit in the electronic device.

11. The method according to claim 9, comprising:
    inputting the unique identification information by means of a dial and thereby setting the delay time corresponding to the unique identification information as a result of forming an integration circuit comprising a particular capacitor-resistor combination.

12. The method according to claim 11, wherein:
    an input of the integration circuit is connected to the input terminal of the switch unit;
    an output of the integration circuit is connected to the control terminal of the switch unit; and
    the switch unit turns on when the output voltage of the control terminal exceeds a prescribed voltage.

13. The method according to claim 9, wherein the system comprises a Radio over Fiber (ROF) system.

14. A system comprising a power supply connected to a plurality of remote units, each of the remote units comprising:
    a switch unit having an input terminal, an output terminal and a control terminal which is adapted to receive a control signal to connect a circuit between the input terminal and the output terminal;
    a number input unit to which unique identification information can be input and which sets a corresponding delay time; and
    a timing unit connected to the power supply and arranged to apply the control signal to the control terminal after the set delay time has lapsed after the power supply has been switched on.

15. The system according to claim 14, wherein the system comprises a Radio over Fiber (ROF) system.

* * * * *